June 18, 1957 H. E. HOLMES 2,796,209
FISH STRINGER AND CARRIER
Filed May 26, 1953 2 Sheets-Sheet 1
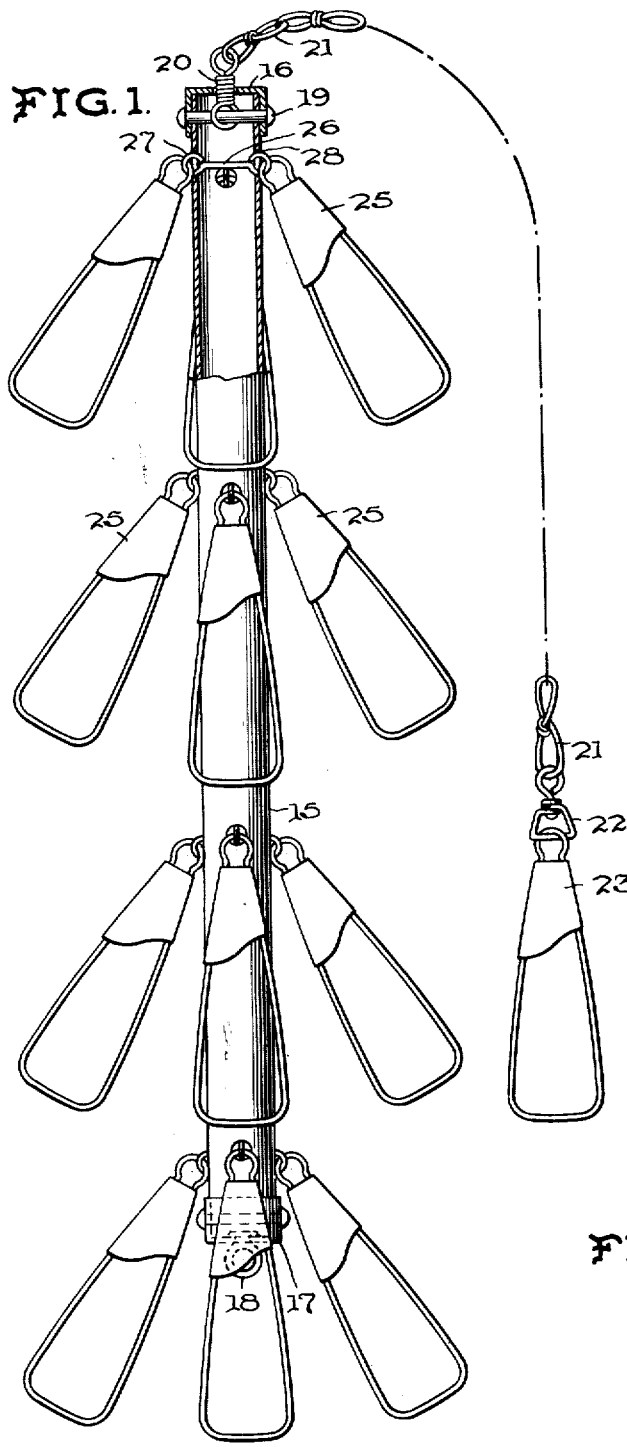
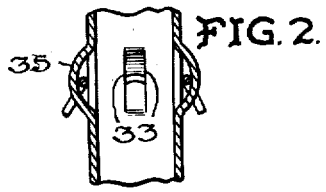
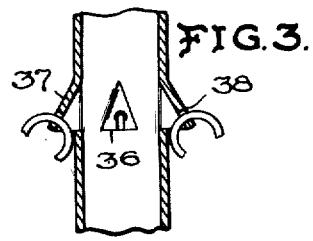
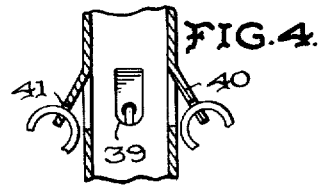
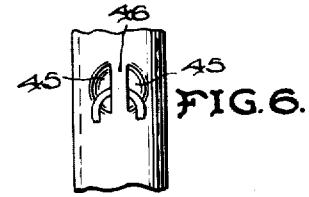
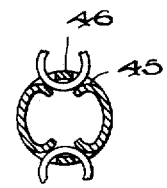
INVENTOR.
HOUSTON E. HOLMES
BY
*Leech & Radue*
ATTORNEYS

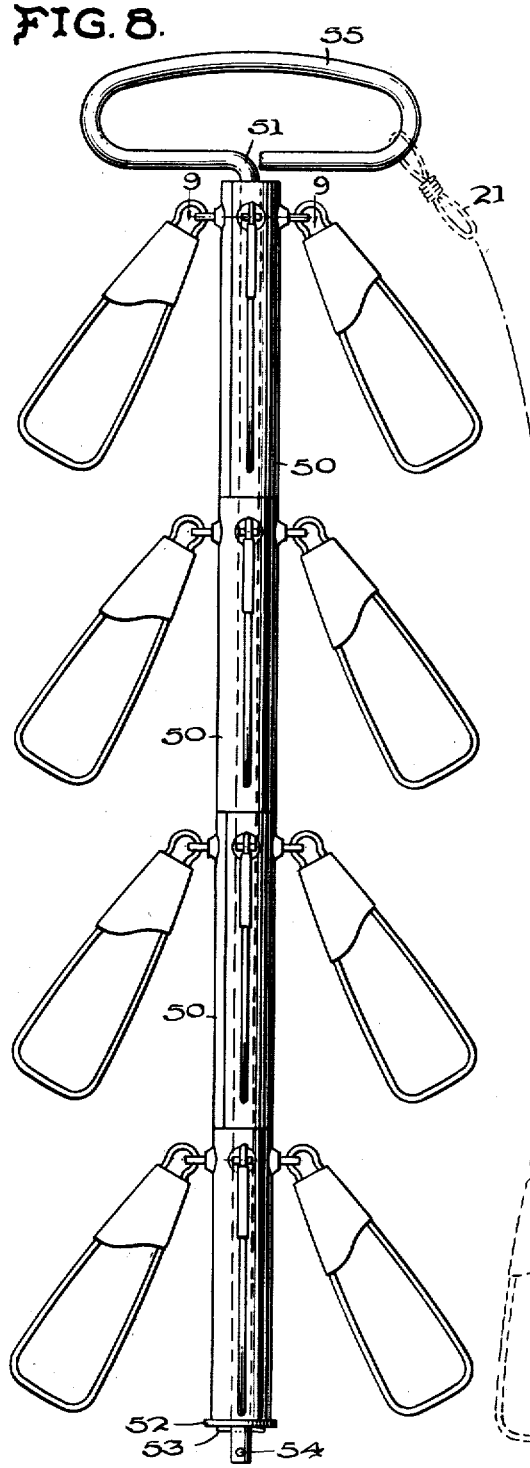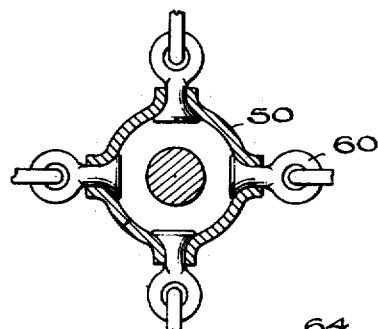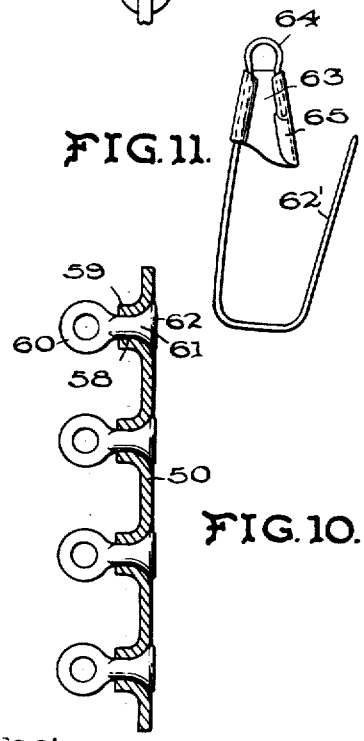

United States Patent Office 2,796,209
Patented June 18, 1957

2,796,209
FISH STRINGER AND CARRIER

Houston E. Holmes, Dallas, Tex.

Application May 26, 1953, Serial No. 357,485

6 Claims. (Cl. 224—7)

This invention relates to fish stringers and carriers for use by sportsmen to facilitate tethering caught fish for immersion and to provide for carrying them conveniently with their heads all substantially the same distance above the ground.

It is a general object of the present invention to provide a novel and improved fish stringer and carrier.

More particularly it is an object of the present invention to provide a fish stringer including a rigid central staff element having tiers of safety hooks arranged along its length, with the hooks in each tier circumferentially spaced about the staff.

Another object of the invention comprises the spacing and arrangement of the hook tiers whereby the staff may be grasped centrally to be carried horizontally with all of the fish heads at a substantially uniform distance above the ground.

Among the important features of the several embodiments of the invention may be mentioned the following:

Swivel mounting of the safety-pin type fish supporting hooks;

Tubular construction of the staff to facilitate hook attachment;

Formation of staff elements from preformed flat sheet metal;

Use of short lengths of safety-hook-supporting-tubes on central rod core with end handle;

Specific methods and arrangements for supporting the hooks from the staff.

Other and further objects and features of the invention will be more apparent to those skilled in the art upon a consideration of the accompanying drawing and following specification wherein are disclosed several exemplary embodiments of the invention with the understanding that such changes and combinations thereof may be made as fall within the scope of the appended claims without departing from the spirit of the invention.

In said drawings:

Fig. 1 is an elevation, partly in longitudinal central section, of a fish stringer and carrier constructed in accordance with one form of the present invention;

Figs. 2 to 6, inclusive, are fragmentary details of several different forms of mounting "eyes" for the safety-pin type fish supporting hooks, the first four of these being in vertical central section and the remaining one in elevation;

Fig. 7 is a horizontal section through the "eye" construction of Fig. 6;

Fig. 8 is an elevation of a modified form of fish stringer and carrier;

Fig. 9 is an enlarged section on line 9—9 of Fig. 10;

Fig. 10 is a transverse section through a flat sheet of metal containing swivel eyes, prior to bending in a tube forming one of the components of the stringer of Fig. 8; and Fig. 11 is a side elevation of a safety-pin type fish holding hook shown in the open position.

Fishermen have long recognized the value of keeping fish alive or at least as fresh as possible by maintaining them immersed in the water in which they have been caught, and various makeshift devices for stringing or tethering fish for the purpose of immersing them have been devised. Perhaps the simplest of these includes the tying of a stick, cork or the like to one end of a piece of fish line and threading the other end successively through a gill and out of the mouth of each fish. The free end is then tied to some part of the boat, dock or a stake driven into the ground where fishing is done from the bank. This permits the fish to swim around and remain moist and in most cases alive for a long time. The likelihood of such a stringer breaking by movements of the fish or of the boat or the like and the possibility that it may not be strong enough to use for carrying a number of fish has led to the development of a so-called "chain" type stringer in which a light metal chain is fitted at intervals with clasp hooks for holding the fish. These are generally of the safety-pin type to insure against the loss of the fish and are large enough to pass up through the gill and out the mouth. Such a stringer permits the fish to be individually attached and removed, but when attempting to carry the fish is subject to the difficulties of the more primitive type, first that the total load may be too much for the relatively light chain, and second that the fish are distributed along its length in such a manner that the lowermost ones of a reasonably sized string cannot be kept from dragging on the ground when the carrying hand of the fisherman grasps the chain adjacent the mouth of the topmost fish thereon. This also makes photography of the catch more difficult.

In accordance with the present invention a rigid type of fish stringer is provided, including a central staff or rod or tube formation from which safety-pin hooks are supported in spaced tiers. The space between the two central tiers is sufficient so that the staff may be grasped between them and thus carried in a horizontal position with the noses of all of the fish substantially the same distance above the ground. This arrangement also maintains the fish better spaced for freedom in swimming when immersed or to better facilitate their being photographed by the proud fisherman.

For a better understanding of the invention reference should be had to the accompanying drawings. In Fig. 1 the complete fish stringer is illustrated. It comprises a rigid central staff 15 formed in this case as a thin walled tube of some non-corrosive material such as aluminum for the sake of lightness. It is capped at the ends and each cap 16, 17 is provided with a swivel, the one at the bottom comprising an eye 18 having a shank passing through a central hole in the cap and headed over on the inside thereof, the cap being secured in position by a transverse rivet. At the upper end a transverse rivet 19 holds the cap in place and passes through one eye of a swivel 20 the shank of which passes through a central opening in the cap 16 so that the remaining eye is available for connection to chain 21 of appropriate length for use when immersing the fish. The free end of the chain is fitted with swivel 22 and safety-pin type hook 23 or other device for attaching the stringer to a ring in the boat or other convenient fastener. The chain is preferably of sufficient length so that hook 23 may be attached to swivel 18 to form a loop for hanging or for supporting the fish for photography.

In the embodiment illustrated in Fig. 1 four tiers of safety-pin type fish supporting hooks are provided, the tiers being reasonably uniformly spaced along the length of the central staff. As shown in the sectional view, two opposed hooks 25 are connected together by a rigid link 26 extending across the tube and having eyes 27 at least partially projecting beyond the holes 28 in the walls of the tube. A second and similar set of hooks and links extend at right angles to the one just described but spaced sufficiently below it so that the links do not interfere. With this arrangement four tiers of four fish each can be hung from the rod. The spacing between the intermediate tiers is equivalent to the width of a man's hand so the staff can be grasped centrally and carried as a balanced load in a horizontal position, thereby maintaining all of the fish above the ground with the least effort.

The staff is very light and less than fourteen inches long so it can be readily accommodated in the conventional tackle box. Being rigid there is no opportunity for the hooks to become entangled as they often do with a chain type stringer. The fish are carefully spaced and maintained separate so they remain alive longer while immersed.

In stead of a rigid transverse link for supporting each pair of safety-pin type hooks, their eyes may be connected together by passing through the eyes 30 of a fishing swivel 31, as seen in Fig. 5, which passes through holes in the walls of the tube sufficiently large to permit the insertion of the swivel, as shown. Where there appears to be no need for swivel attachment one of the forms of "eyes" for the hooks shown in Figs. 2, 3, 4, 6 and 7 may be used.

In Fig. 2 the tube walls are longitudinally slit as at 33 and 34 in spaced parallel lines and the band of metal between them and attached at the top and bottom is bowed outwardly as at 35 to provide a passage for the loop of a hook. Any number of these attaching "eyes" may be arranged about the periphery of the tube.

In the construction of Fig. 3 the metal is slit transversely at 36 to permit striking out a semi-conical portion 37 which is perforated at 38 for the passage of the loop of a hook.

In Fig. 4 the slitting is somewhat like in Fig. 2, but the only attachment is at the top, the side slits being connected by the arcuate part 39 at the bottom. The tab is then bent outwardly as at 40 and perforated at 41 for the hook.

In the construction of Figs. 6 and 7 two laterally spaced semi-dimples 45 provide the straps 46 slit from them on its vertical edges so that a hook may be passed beneath as seen in the figure. Other appropriate means may be used for attaching the hooks.

In the form of the invention illustrated in Fig. 8 added facility for orderly arrangement of the fish in the string when being carried is provided by permitting each tier of hooks to be rotated independently of the others. For this purpose each tier is attached to a separate tubular section 50 and an appropriate number, preferably four, of these is threaded onto a central rod 51 and secured by means of washer 52 threaded over the rod and positioned by cotter pin 53. The nub of the rod projecting beyond this is perforated at 54 to form an eye to optionally receive hook 23' on the end of chain 21' used for tethering the stringer.

The projecting upper end of the rod is formed into a loop handle 55 for carrying the stringer when the fish thereon are not so long as to drag on the ground. Otherwise the carrier is more appropriately handled by grasping it near its center as described in connection with Fig. 1.

The short tubular sections may be conveniently bent from flat sheets of metal. In fact the tube of Fig. 1 may be bent with assurance that the caps will prevent it from ever opening up.

Fig. 10 shows in section, through the fitted eyes a sheet of metal such as used to form one of the elements 50 of the embodiment of Fig. 8. The openings 58 are punched without removing the metal, which is bent outwardly to form the spigots 59. Each of these provides a convenient mounting for an eye 60, this having a shank 61 passing through the spigot and being staked over at 62 into a head to prevent it from being removed. The sheet is then bent up into tubular form as seen in cross-section in Fig. 9 and hooks are attached, one for each eye. Thereafter a suitable number of the assembled tube sections are threaded over the central rod and secured thereon.

The safety-pin type of hook shown in the open position in Fig. 11 is more or less conventional and is formed of a length of spring wire 62' bent to the shape shown and fitted with a sheet metal shroud 63 closing the loop 64 and providing the catch 65 for holding the hook closed in the position shown in the other figures of the drawing.

While the cross-section of the tubes illustrated in Figs. 1 and 8 is circular, it is obvious that any suitable cross-section may be used and that any types of attachment or "eye" connection with or without swivels may be used with any style of fish holding hook. The fish carrier of the present invention contains many more hooks than the usual type stringer and yet is short enough to fit into a tackle box and the hooks are so arranged that tangling cannot occur.

I claim:

1. A fish stringer and carrier comprising, in combination, a straight rigid tubular staff member, means forming mounting eyes adjacent the surface of said staff, said eyes being arranged in spaced fixed tiers with the eyes of each tier fixedly spaced circumferentially, a safety-pin type fish holding hook looped through each eye, the tier spacing being greater than the length of a hook, a swivel eye at each end of said staff, a chain secured to one of said eyes and a safety hook on the free end of said chain.

2. The device as claimed in claim 6 in which each eye is part of a swivel extending through said staff.

3. A fish stringer and carrier having, in combination, a straight rigid rod, a loop handle at one end of said rod, a plurality of like tubular sections loosely fitted in abutting relation over said rod, means on the opposite end of the rod to maintain said sections thereon, each section being bent from a flat sheet into tubular form, a plurality of fish holding hooks articulated to and circumferentially spaced about the upper end of each section and means to secure a tether chain to one end of said rod.

4. The device as defined in claim 3 in which the hooks are swivelled to the sections and means is provided to hook the opposite end of the chain to the remaining end of the rod.

5. A fish stringer and carrier comprising, in combination, a straight, rigid central staff member, mounting eyes attached to said staff and arranged not less than three to an annular tier, said tiers being of even number, spaced apart longitudinally throughout the length of the staff with the end tiers closely adjacent the staff ends, the spacing between the center tiers being sufficient to receive a hand grasping the staff to carry the stringer horizontally in approximate balance, a safety-pin type fish holding hook hinged to each eye and means for attaching a suspension chain to one end of said staff.

6. A fish stringer and carrier having, in combination, a rigid tubular staff of the order of one-half inch in diameter, means on the staff providing a plurality of tiers of attaching eyes, each tier having four eyes fixedly and uniformly spaced about the circumference of the staff, the tiers being spaced apart along the staff and arranged to provide a center portion of the staff free of eyes for the width of a hand to facilitate grasping thereof, a safety-pin type of fish carrying hook secured to each eye, and swivel means at at least one end of said staff for attachment of a supporting chain for the stringer.

References Cited in the file of this patent

UNITED STATES PATENTS

| Number | Name | Date |
|---|---|---|
| 486,649 | Verhaven | Nov. 22, 1892 |
| 1,560,938 | Lund | Nov. 10, 1925 |
| 2,004,247 | McCaul | June 11, 1935 |
| 2,062,386 | Withey | Dec. 1, 1936 |
| 2,184,073 | Fuiks | Dec. 19, 1939 |
| 2,226,402 | Hirschmann | Dec. 24, 1940 |
| 2,297,623 | Hickman | Sept. 29, 1942 |
| 2,517,761 | Boyer | Aug. 8, 1950 |
| 2,708,538 | Matras | May 17, 1955 |